US006707808B1

(12) United States Patent
Vedrine

(10) Patent No.: US 6,707,808 B1
(45) Date of Patent: Mar. 16, 2004

(54) METHOD AND SYSTEM FOR FAST ACCESS TO AN UPLINK CHANNEL IN A MOBILE COMMUNICATION NETWORK

(75) Inventor: Arnaud Vedrine, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/527,415

(22) Filed: Mar. 17, 2000

(51) Int. Cl.[7] .................................................. H04J 3/00
(52) U.S. Cl. ........................ 370/337; 370/337; 370/347
(58) Field of Search ................................ 370/337, 347, 370/346, 345, 348, 461, 462, 447

(56) References Cited

U.S. PATENT DOCUMENTS

| 4,949,395 A |   | 8/1990  | Rydbeck ................ 455/33   |
|-------------|---|---------|----------------------------------|
| 5,420,864 A | * | 5/1995  | Dahlin et al. ............ 370/95.3 |
| 5,475,869 A |   | 12/1995 | Gomi et al. ............. 455/63  |
| 5,519,779 A |   | 5/1996  | Proctor et al. ........... 380/34 |
| 6,031,832 A | * | 2/2000  | Turina ................... 370/348 |
| 6,404,756 B1| * | 6/2002  | Whitehill et al. ......... 370/338 |
| 6,584,087 B1| * | 6/2003  | Czaja et al. ............. 370/335 |
| 6,594,240 B1| * | 7/2003  | Chuah et al. ............ 370/328 |

FOREIGN PATENT DOCUMENTS

| EP | 1 006 695 A1 | 6/2000 |
| WO | WO 98/35523  | 8/1998 |
| WO | WO 98/37706  | 8/1998 |

OTHER PUBLICATIONS

U.S. patent application Ser. No. 09/568,451, Védrine, filed May 9, 2000.
U.S. patent application Ser. No. 09/568,452, Lindheimer et al., filed May 9, 2000.
Guo, et al., "Aggressive Packet Reservation Multiple Access Using Signatures," *IEEE International Symposium on Personal, Indoor and Mobile Radio Communications*, Sep. 18, 1994, pp. 1247–1253.
EP Standard Search Report, Nov. 15, 2000.

* cited by examiner

*Primary Examiner*—Kenneth Vanderpuye
*Assistant Examiner*—Robert W. Wilson

(57) ABSTRACT

Fast access to an uplink channel for a mobile station in a packet data radio network can be obtained by causing a collision in an uplink radio block. A first uplink block of the uplink channel is initially assigned to a first mobile station. During the first uplink block, however, a transmission from a second mobile station is received on the uplink channel. In response, a subsequent uplink block of the uplink channel is assigned to the second mobile station.

27 Claims, 4 Drawing Sheets

METHOD AND SYSTEM FOR FAST ACCESS TO AN UPLINK CHANNEL IN A MOBILE COMMUNICATION NETWORK

BACKGROUND OF THE INVENTION

1. Technical Field of the Invention

The present invention relates in general to multiplexing users in a telecommunication system, and in particular to a method and system for accessing communication resources in a radio network.

2. Description of Related Art

In connection with the development of third generation mobile communication systems, new wireless multimedia and data applications are being designed and introduced. To support these new applications, improved data transmission technologies are also being developed. One such technology is Enhanced Data rates for Global Evolution (EDGE), which uses a more efficient air-modulation technology that is optimized for data communications and that can be implemented on existing GSM and IS-136 systems. When used in connection with General Packet Radio Service (GPRS), a packet-switched technology that delivers speeds of up to 115 kilobits per second (kbit/s), EDGE technology can increase end user data rates up to 384 kbit/s, and potentially higher in high quality radio environments.

In connection with the development of EDGE and other technologies for supporting higher data rates, a number of techniques for multiplexing different users on the same set of resources have been developed. For example, in the packet-switched mode of EDGE technology (i.e., Enhanced GPRS (EGPRS), such as EGPRS standard release 99), the capability exists to multiplex different users on the same time slot. In this mode, packet data is transferred via a wireless communication link using 20 millisecond (ms) radio blocks. Each radio block is transferred to or from a particular user as a sequence of four consecutive bursts on a time slot that is assigned to the user. Subsequently, the time slot can be assigned to another user for the transmission of four bursts to or from that other user or can be again assigned to the same user for the transmission of an additional four bursts.

To send data on the downlink, the base station knows when new packets need to be transmitted to each user. Accordingly, the base station transmits data destined for a particular user as part of a temporary block flow (TBF). The TBF is a connection used by the base station and the user's mobile station to support the unidirectional transfer of packet data on a packet data physical channel. The network assigns each TBF a temporary flow identity (TFI) value, which uniquely identifies the TBF, thereby distinguishing the TBF from other TBFs destined for other mobile stations. Based on the TFI value, each individual mobile station that is multiplexed on a specific packet data physical channel is able to determine which data packets are meant for that mobile station. In other words, the base station is able to address data packets to particular mobile stations using the appropriate TFI value. On the uplink portion of the communication, however, the situation is more cumbersome because the base station does not know which mobile stations need to send data packets unless and until the mobile stations notify the base station that they have data to be sent.

To facilitate data transfers on the uplink, therefore, a mobile station that needs uplink resources informs the base station that it has data packets to send by sending a message on the random access channel (RACH) or the packet RACH (PRACH), which are control channels used only on the uplink to request GPRS resources. The base station can then schedule uplink resources for the mobile station by sending an uplink state flag (USF) in the header of a radio block that is sent on the downlink. The USF serves to identify the specific mobile station that is authorized to send data packets in the next uplink radio block.

The problem with this process is that the radio channel activation procedure (i.e., for a mobile station to obtain authorization to use a radio channel on the uplink) can take a relatively long time (up to 300 ms), even if the mobile station successfully obtains authorization on the first attempt to request such access. In some cases, however, a collision can occur between two or more different mobile stations attempting to request access to the radio channel at the same time. When such a collision occurs, the mobile station backs off and waits until a later time to resend the request. As a result, the delay for accessing the radio channel is further increased.

In connection with more recent EGPRS standards (i.e., EGPRS standard release 00), real time applications (e.g., voice-over-IP (VoIP)) will be supported. With the introduction of new such services or applications over packet data systems, there will be a large variety of Quality of Service (QoS) demands on the network. Certain users (e.g., those utilizing real time voice applications) will have a very high demand for the availability of transmission resources, whereas users who transmit short messages or electronic mail will be satisfied with a lower availability of transmission resources.

For example, in the well known Universal Mobile Telecommunications System (UMTS), there are four proposed QoS classes: the conversational class, streaming class, interactive class, and background class. The main distinguishing factor between these classes is the sensitivity to delay of the traffic. Conversational class traffic is intended for traffic which is very delay sensitive while background class traffic is the most delay insensitive traffic class. Conversational and streaming classes are intended to be used to carry RT traffic flows and interactive and background classes are intended to be used to carry Internet applications (e.g., WWW, E-mail, Telnet, FTP, etc.).

Real time services include sensitive time constraints over a reserved access channel. That is, delays in the transmission and/or receipt of successive packets can have noticeable and undesirable QoS effects (e.g., on voice quality). These time constraints can be handled by always reserving access time at predetermined intervals during a communication with high QoS demands. In this way, a real time service communication can proceed uninterrupted since it will be allocated communication resources regardless of whether or not any packets will be sent. In other words, silent periods will occur in a real time voice communication, and to conserve battery resources, the silent periods need not be transmitted.

In addition, it will be possible to multiplex real time users with non-real time users on the same time slot. This can be accomplished by transmitting the non-real time users blocks during the silent periods of the real time user, such as between the talkspurts of a speech user. To support such multiplexing, the real time user would simply request radio channel activation at the beginning of a talkspurt that follows a silent period. The delay inherent in existing radio channel activation procedures, however, is generally unacceptable for real time applications, particularly in the case of VoIP applications because the first blocks of a talkspurt are very important to maintain users perceptions of high speech quality. Accordingly, real time users must be able to access the radio channel much faster than is supported by existing procedures.

There is a need, therefore, for a method and system that would allow real time users to quickly and efficiently obtain access to uplink radio channels for purposes of transmitting packet data. The system and method should allow multiplexing of real time users with other users on the same radio channel. Preferably, requests for such access would also require only a minimal amount of bandwidth so as to avoid using up valuable radio resources.

SUMMARY OF THE INVENTION

The present invention comprises a method and system for obtaining fast access to a multiplexed uplink channel in a mobile telecommunications network. In accordance with one embodiment of the invention, a first uplink block of an uplink channel is assigned to a first mobile station. During the first uplink block, however, a transmission from a second mobile station is received on the first uplink block of the uplink channel. In response to the transmission from the second mobile station, a subsequent uplink block of the uplink channel is assigned to the second mobile station.

In accordance with another embodiment of the invention, a mobile telecommunications system includes a packet data network and a radio network. The packet data network includes a packet data support node for routing data communications to and receiving data communications from a plurality of mobile stations located in an area served by the packet data support node. The radio network serves to transmit data packets between the mobile stations and the packet data support node and operates to assign to a first mobile station a first radio resource associated with an uplink channel. The radio network further operates to detect a transmission from a second mobile station on the first radio resource and, in response to the detected transmission, to assign a second radio resource associated with the uplink channel to the second mobile station.

In another embodiment, a plurality of mobile stations are assigned to an uplink channel, wherein at least one of the mobile stations is operating in accordance with a real time application. Simultaneous transmissions from multiple ones of the mobile stations are subsequently detected on a first block of the uplink channel. In response to this detection of simultaneous transmissions on the first block, a second block of the uplink channel is assigned to a particular real time mobile station.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
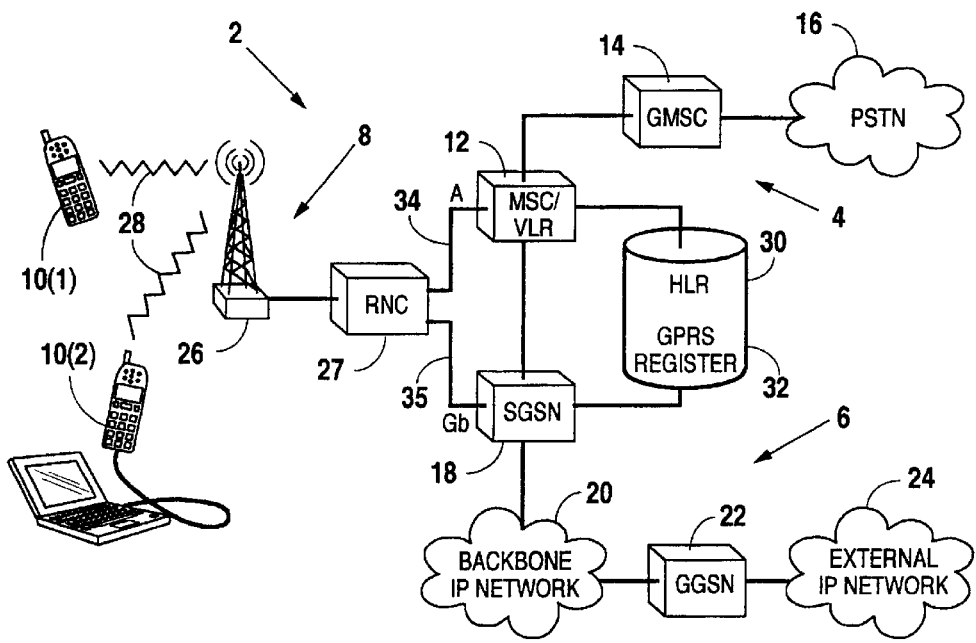
FIG. 1 is a block diagram of a mobile telecommunications system in which the present invention can be implemented.

Reference is now made to the Drawings wherein like reference characters denote like or similar parts throughout the various Figures. Referring now to FIG. 1, there is illustrated a block diagram of a mobile telecommunications system 2 in which the present invention can be implemented. In particular, the system 2 depicted in the Figure is a time division multiple access (TDMA) system, which operates according to IS-136 standards. Although the invention is illustrated and described in connection with a TDMA system, it will be recognized by those skilled in the art that the invention is also applicable in other types of telecommunications systems, such as GSM. In addition, the system supports EGPRS technology. The mobile telecommunications system 2 includes a circuit-switched network 4, a packet-switched network 6, and a radio network 8 that is shared by the circuit-switched and packet-switched networks 4 and 6. Generally, the circuit-switched network 4 is primarily used for voice applications, while the packet-switched network 6 is primarily used for data applications. In accordance with third generation mobile telecommunications standards, however, the circuit-switched network 4 can also support data communications, and the packet-switched network 6 can also support voice communications.

The circuit-switched network 4 includes a number of mobile switching center/visitor location registers (MSC/VLRs) 12. For purposes of simplifying the illustration, however, only one MSC/VLR 12 is shown. Each MSC/VLR 12 serves a particular geographic region and is used for controlling communications in the served region and for routing communications to other MSC/VLRs 12. The VLR portion of the MSC/VLR 12 stores subscriber information relating to mobile stations 10 that are currently located in the served region. The circuit-switched network 4 further includes at least one gateway mobile switching center (GMSC) 14 that serves to interconnect the circuit-switched network 4 with external networks, such as a public switched telephone network (PSTN) 16.

The packet-switched network 6 includes a number of serving GPRS support nodes (SGSN) 18, which are used for routing and controlling packet data communications, and a backbone IP network 20. A gateway GPRS support node (GGSN) 22 interconnects the packet-switched network 6 with an external IP network 24 or other external data networks.

The radio network 8 includes a plurality of cells. Each cell in the mobile telecommunications system 2 is served by a base station 26 that communicates with mobile stations 10 in the cell via an air interface 28. As is currently being planned for future TDMA systems integrated with a packet-switched GPRS network, a radio network controller (RNC) 27 will control a plurality of base stations 26 (as in existing GSM systems). For circuit-switched communications, signals are routed from the MSC/VLR 12, to the radio network controller 27 via an A interface 34, to the base station 26 for the cell in which the target mobile station 10 is currently located, and over the air interface 28 to the mobile station 10. For packet data transmissions, on the other hand, signals are routed from the SGSN 18, to the radio network controller 27 via a Gb interface 35, to the base station 26 for the cell in which the target mobile station 10 is currently located, and over the air interface 28 to the mobile station 10.

Each mobile station 10 is associated with a home location register (HLR) 30. The HLR 30 stores subscriber data for the mobile station 10 that is used in connection with circuit-switched communications and can be accessed by the MSC/VLRs 12 to retrieve subscriber data relating to circuit-switched services. Each mobile station 10 is also associated with a GPRS register 32. The GPRS register 32 stores subscriber data for the mobile station 10 that is used in connection with packet-switched communications and can be accessed by the SGSNs 18 to retrieve subscriber data relating to packet-switched services.

In the TDMA system 2, voice and data communications are sent via the air interface 28 using one or more time slots. In many cases, each time slot is allocated to a single mobile station 10 for use in, receiving communications from, and transmitting communications to, the base station 26. In EGPRS, however, different users can be multiplexed on the same time slot by alternately allocating 20 ms radio blocks to the different users. To accomplish this multiplexing, the different users are addressed by use of Temporary Flow Identities (TFIs), which uniquely identify each data transfer, and Uplink State Flags (USFs), which are used by the telecommunications network to assign particular time slots for use by specific mobile stations in the uplink.

Figure 2:
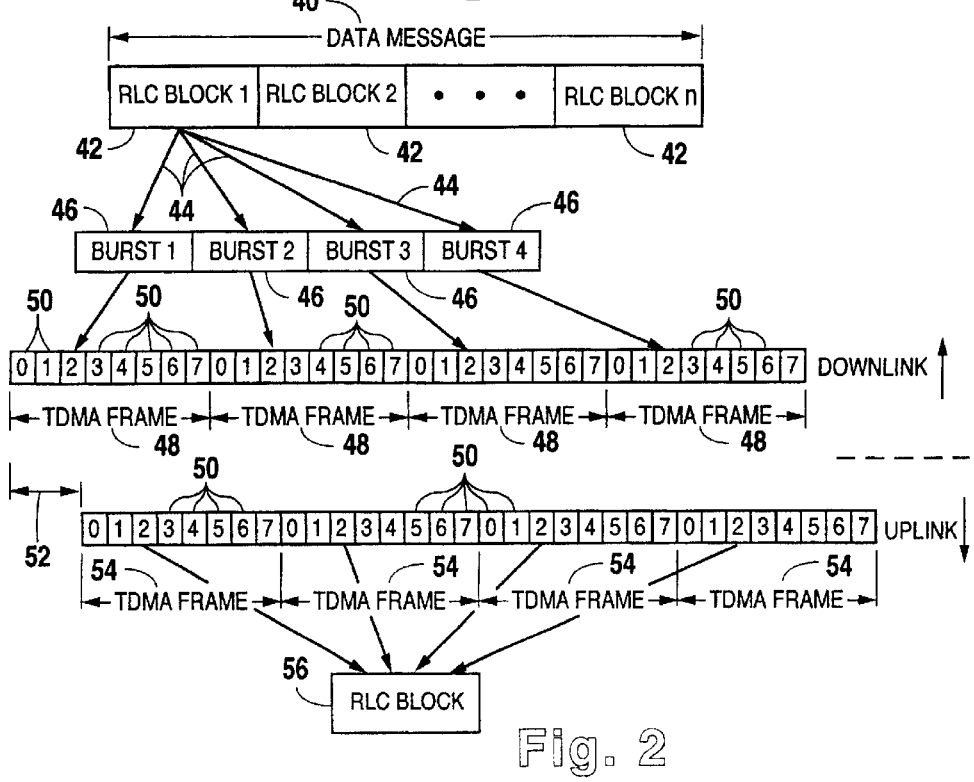
FIG. 2 is a schematic diagram exemplifying a segmentation of data in connection with Enhanced General Packet Radio Service technology.

Referring now to FIG. 2, there is shown a schematic diagram exemplifying a segmentation of data in connection with EGPRS technology. Because EGPRS is designed to be compatible with existing GSM and TDMA systems, the data is processed and arranged for transmission in EGPRS in much the same way as in GSM and TDMA. In particular, a data message 40 (i.e., comprising part of a temporary block flow (TBF)) to be sent over a wireless interface is segmented into a number of Radio Link Control (RLC) blocks 42. In addition to application data, the RLC blocks 42 further include an RLC header containing, among other things, a TFI that corresponds to the TBF. Each RLC block 42 is block encoded (including the addition of Uplink State Flags (USFs)), convolution encoded, and interleaved, and the resulting data structure is mapped (as indicated at 44) into a sequence of four consecutive bursts 46. The bursts 46 are then modulated using an appropriate modulation and coding scheme, as selected depending upon the current channel quality. Then, each burst 46 is transmitted over the air interface 28 in a downlink TDMA time slot 50 defining a radio channel that has been assigned to the target mobile station 10. Generally, the radio channels are divided into downlink TDMA frames 48, each of which includes eight time slots 50. In this case, it is assumed that timeslot 2 has been assigned for use by the target mobile station of the data message 40. Thus, the four bursts 46 are transmitted in timeslot 2 of four consecutive downlink TDMA frames 48.

At the receiving end, the mobile stations 10 that are assigned to timeslot 2 receive and decode the four bursts 46 to identify the TFI for the RLC block 42 and to identify a USF that is encoded in the bursts 46. Typically, the USF is interleaved over all four of the bursts 46. Based on the TFI, the target mobile station 10 determines that the RLC block contains data intended for that mobile station 10. Conversely, the other mobile stations 10 assigned to timeslot 2 are able to determine that the RLC block 42 encoded in the four consecutive bursts 46 is not intended for them. Each of the mobile stations 10 assigned to timeslot 2 also examines the USF, which identifies the specific mobile station 10 that is authorized to transmit data in the next uplink RLC block of timeslot 2.

According to GPRS and GSM standards, the start of an uplink TDMA frame 54 is delayed (as indicated at 52) by a fixed offset period of three timeslots 50 from the start of the downlink TDMA frame 48. The staggering of TDMA frames 48 and 54 in this manner permits the same timeslot 50 to be used for both uplink and downlink while avoiding any need for the mobile station 10 to transmit and receive simultaneously. In this case, uplink timeslot 2 of the TDMA frame 54 is used by a mobile station 10 that was authorized to use the timeslot 50 in the USF of a downlink RLC block 42 (not shown) transmitted in an immediately preceding four burst 46 sequence (i.e., in a downlink RLC block 42 that started one block+ three timeslot offset= thirty five timeslots 50 before the beginning of the current uplink RLC block 56).

In each downlink RLC block 42, the transmitted USF value generally identifies a particular mobile station 10 that is authorized to transmit on the next uplink block 56. In some cases, however, the USF value is set to "free," which indicates that the next uplink block 56 is not assigned for use by any particular mobile station 10 but instead is allocated for use as a packet random access channel (PRACH). In such a case, each mobile station 10 that has data to transmit randomly selects one of the four uplink bursts (contained in a particular timeslot of four consecutive TDMA frames 54) on which to transmit a request for a channel allocation. Thus, to obtain access to an uplink channel, each mobile station 10 must wait for the next available PRACH allocation (or use the RACH). In addition, if a request for a channel allocation collides with a similar request from another mobile station 10, then the requesting mobile station 10 must wait for the next PRACH allocation to re-transmit the request.

To obtain an uplink channel assignment, a mobile station 10 must wait for a USF on the downlink indicating that the next RLC block 42 or 56 is allocated as a PRACH before it can transmit a request for authorization to send data in the next uplink block 56. Even if a collision on the PRACH does not occur, this process can take up to 300 ms, depending on how long the mobile station 10 has to wait for a PRACH. One way to reduce the delay experienced by the real time user in accessing the uplink channel would be to create a new fast access control channel. Such a solution, however, would require the dedication of valuable radio resources to the new control channel.

In accordance with the present invention, a real time user (or other high priority user) can obtain access to a radio channel without having to wait for an allocated PRACH on which to request access. Furthermore, based on the present invention, the mobile station 10 does not have to wait to retransmit an access request in cases where a collision involving the access request occurs. Instead, as soon as a real time user's mobile station 10 has data to transmit, it transmits data on the current uplink block 56, even if the current uplink block 56 is not allocated for use as a PRACH. Generally, the current uplink block 56 will already have been assigned for use by a different mobile station 10. As a result, the transmission by the real time user's mobile station 10 will create a collision on the current uplink block 56. When the base station 26 or radio network controller 27 detects such a collision (either on the PRACH, if the current uplink block is allocated as a PRACH, or between a non-real time user and the real time user in a block 56 on which the non-real time user was scheduled), the base station 26 schedules the real time user in the next uplink block 56. The detection of such a collision is facilitated if the real time and the non-real time users include different training sequences in their respective bursts.

Figure 3:
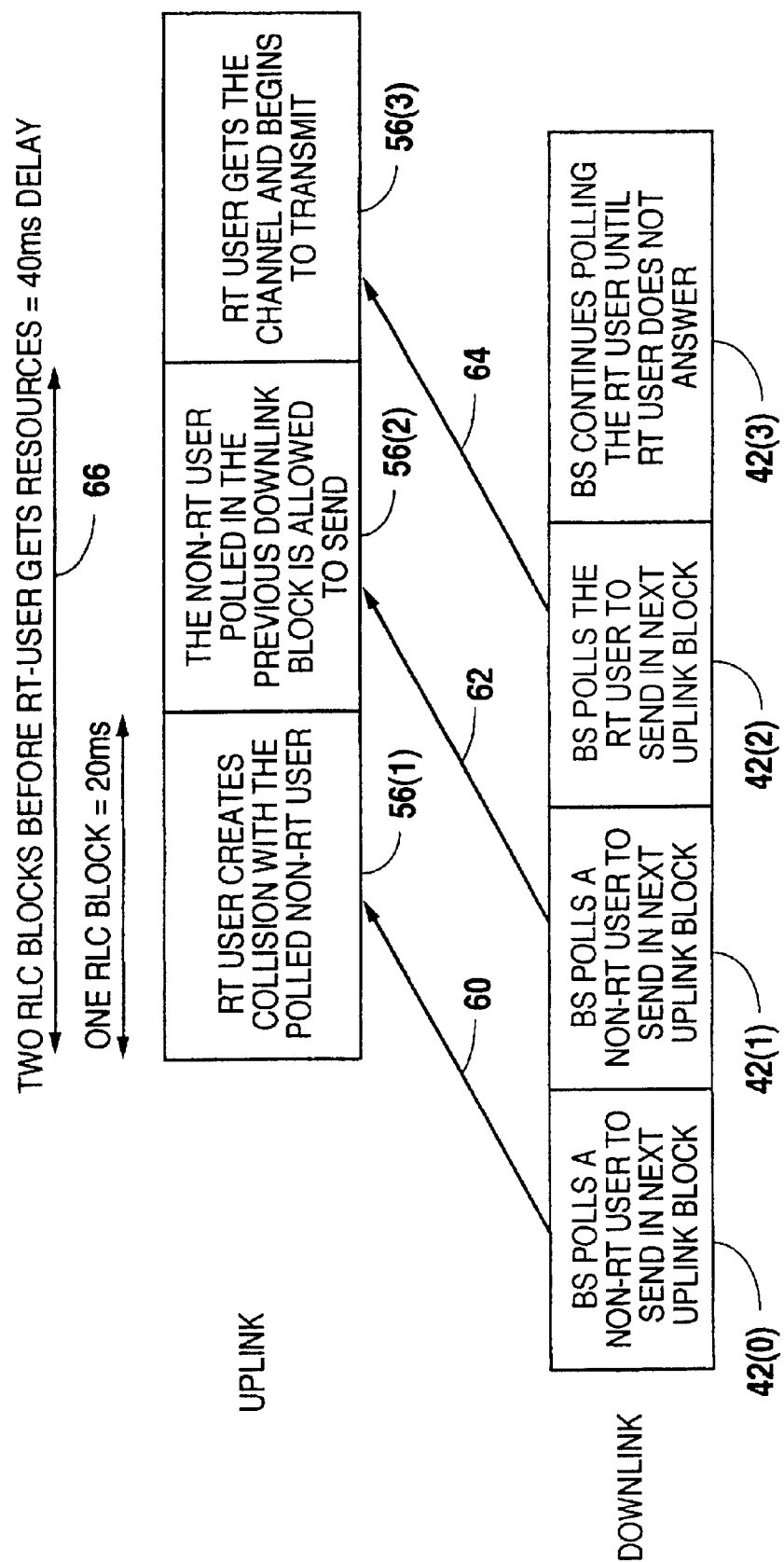
FIG. 3 is a schematic diagram of a process for obtaining fast access to an uplink channel in a multiplexed packet data network in accordance with one embodiment of the invention.

Referring now to FIG. 3, there is illustrated a schematic diagram of a process for obtaining fast access to an uplink channel in a multiplexed packet data network 6 in accordance with one embodiment of the invention. Pursuant to the process, the base station (BS) 26 sends RLC blocks 42 on a specific timeslot 50 of a downlink packet data channel, on which a plurality of mobile stations 10 are multiplexed. Each downlink RLC block 42 contains a TFI that indicates to which of the multiplexed mobile stations 10 the data contained in the downlink RLC block 42 is addressed. In addition, each downlink RLC block 42 further includes a USF value indicating which of the multiplexed mobile stations 10 is authorized to transmit in the next uplink RLC block 56. This process is sometimes referred to as polling a mobile station. The authorized mobile station 10 then sends, in the next uplink RLC block 56, data on the same timeslot 50 of the uplink packet data channel.

In an initial downlink block 42(0), the base station 26 polls a non-real time user 10(2) to authorize (as indicated at 60) the non-real time (non-RT) user 10(2) to send data in the next (first) uplink block 56(1). This polling is accomplished by including in the initial downlink block 42(0) a USF value associated with that non-RT user 10(2). Before the beginning of the first uplink block 56(1), the base station 26 also polls, in a first downlink block 42(1), another (or the same) non-real time user 10(2) to authorize (as indicated at 62) the non-real time user 10(2) to send data in a second uplink block 56(2). Also during this time (i.e., between the end of the initial downlink block 42(0) and the beginning of the first uplink block 56(1)), a real time (RT) user 10(1) acquires data to transmit (e.g., resulting from the beginning of a talkspurt wherein the real time user is supporting a voice application). Accordingly, the real time user 10(1) sends an entire block of data in the first uplink block 56(1), thereby creating a collision with a block of data transmitted from the non-real time user 10(2) that was authorized, in the initial downlink block 42(0), to use the first uplink block 56(1).

When the base station 26 detects the collision, it knows that the real time user 10(1) has real time data to transmit. As a result, in the next downlink block 42(2), the base station 26 polls the real time user 10(1) to authorize (as indicated at 64) the real time user 10(1) to transmit on a third uplink block 56(3). At about the same time, the non-real time user 10(2) polled in the previous (first) downlink block 42(1) is allowed to send data undisturbed in the second uplink block 56(2). Subsequently, in response to the polling of the real time user 10(1) in the second downlink block 42(2), the real time user 10(1) begins to transmit data in a third uplink block 56(3), while the base station 26 continues polling the real time user 10(1) in a third and all subsequent downlink blocks 42(3) until the real time user 10(1) stops responding to the polling because it has no more data to transmit. In accordance with this method of obtaining fast access, a real time user 10(1) will only experience a 40 ms delay in accessing the uplink channel. This delay corresponds to the time (as indicated at 66) between the beginning of the first uplink block 56(1), on which the real time user 10(1) creates a collision, and the beginning of the third uplink block 56(3), on which the real time user 10(1) is authorized to begin transmitting.

Although the invention is described as allowing a real time user 10(1) to create a collision in an uplink block 56 that is assigned to another mobile station 10(2), the same result can be achieved by creating a collision in an uplink block 56 that is allocated for use as a PRACH. Furthermore, the invention is not limited to obtaining fast access to a radio channel for a real time user but can be used to obtain fast access for any high priority user.

In a preferred embodiment of the invention, to ensure that the base station 26 detects the real time user's unauthorized uplink block 56(1) or the collision created thereby, the power at which non-real time users transmit blocks of data is limited to a threshold value less than the maximum power level. In some cases, this power limitation might even allow the base station 26 to be able to decode the received real time user's uplink block despite the interference caused by the authorized transmission from the non-real time user 10(2). Alternatively, the same or a similar result can be achieved by having the real time user 10(1) transmit its initial block of data (i.e., in uplink block 56(1)) at the maximum transmission power. In cases where the decoding of the data sent by the real-time user succeeds in spite of the collision, the real-time user may continue transmitting also on the second block, even though the base station has not assigned this block to him. In this case, no delay would be experienced at all by the real-time user for accessing the channel.

Figure 4:
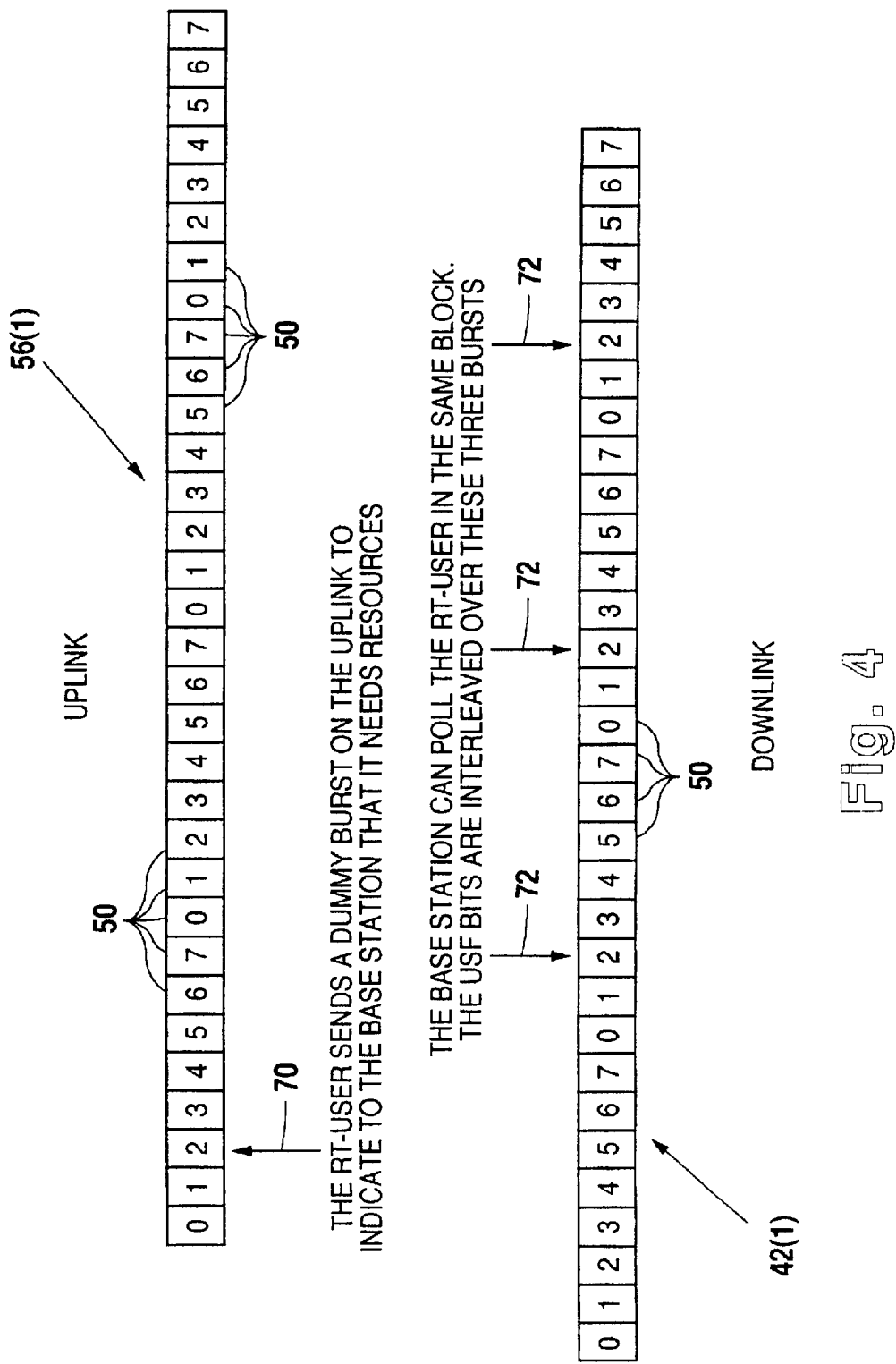
FIG. 4 a schematic diagram of a process for obtaining fast access to an uplink channel in a multiplexed packet data network in accordance with an alternative embodiment of the invention.

In accordance with another embodiment of the invention, the delay in obtaining uplink channel access experienced by the real time user 10(1) can further be reduced. Referring now to FIG. 4, there is illustrated a schematic diagram of a process for obtaining fast access to an uplink channel in a multiplexed packet data network 6 in accordance with such an alternative embodiment of the invention. Instead of sending an entire block of data as in the embodiment depicted in FIG. 3, a real time user 10(1) that has data to send transmits only one uplink burst to indicate to the base station 26 that it needs the uplink channel. In particular, it is assumed that a first uplink block 56(1) is scheduled for use by a non-real time user 10(2). Accordingly, the non-real time user 10(2) transmits, in the first uplink block 56(1), a block of data in a four burst sequence (e.g., in timeslot 2 of four consecutive TDMA frames 54). The real time user 10(1), however, sends a dummy burst (as indicated at 70) to create a collision on the first burst of the four burst sequence in the first uplink block 56(1). By detecting this collision, the base station 26 is informed that the real time user 10(1) has data to transmit.

As a result the base station 26 could poll the real time user 10(1) in a subsequent (second) downlink block 42(2), as in the embodiment discussed in connection with FIG. 3. Preferably, however, interleaving of the USF is confined to the last three bursts 46 of the downlink blocks 42. Accordingly, once the base station 26 detects the collision in the first burst of the first downlink block 56(1), the base station can authorize the real time user 10(1) to transmit on a second uplink block 56(2) by designating the USF value for the real time user 10(1) in the last three bursts of the first downlink block 56(1) (as indicated at 72). In other words, the base station 26 can poll the real time user 10(1) in the same block as it detects the collision.

This embodiment allows the delay experienced by the real time user in accessing the uplink channel to be reduced to only 20 ms, corresponding to the time between the beginning of the first uplink block 56(1), on the first burst of which the real time user 10(1) creates a collision, and the beginning of a second uplink block 56(2), on which the real time user 10(1) is authorized to begin transmitting. In addition, by corrupting only one burst of the non-real time user's four burst sequence, the non-real time user uplink block can, in many cases, be restored as a result of the coding used for the block and/or an incremental redundancy in the bursts of the uplink block.

Figure 5:
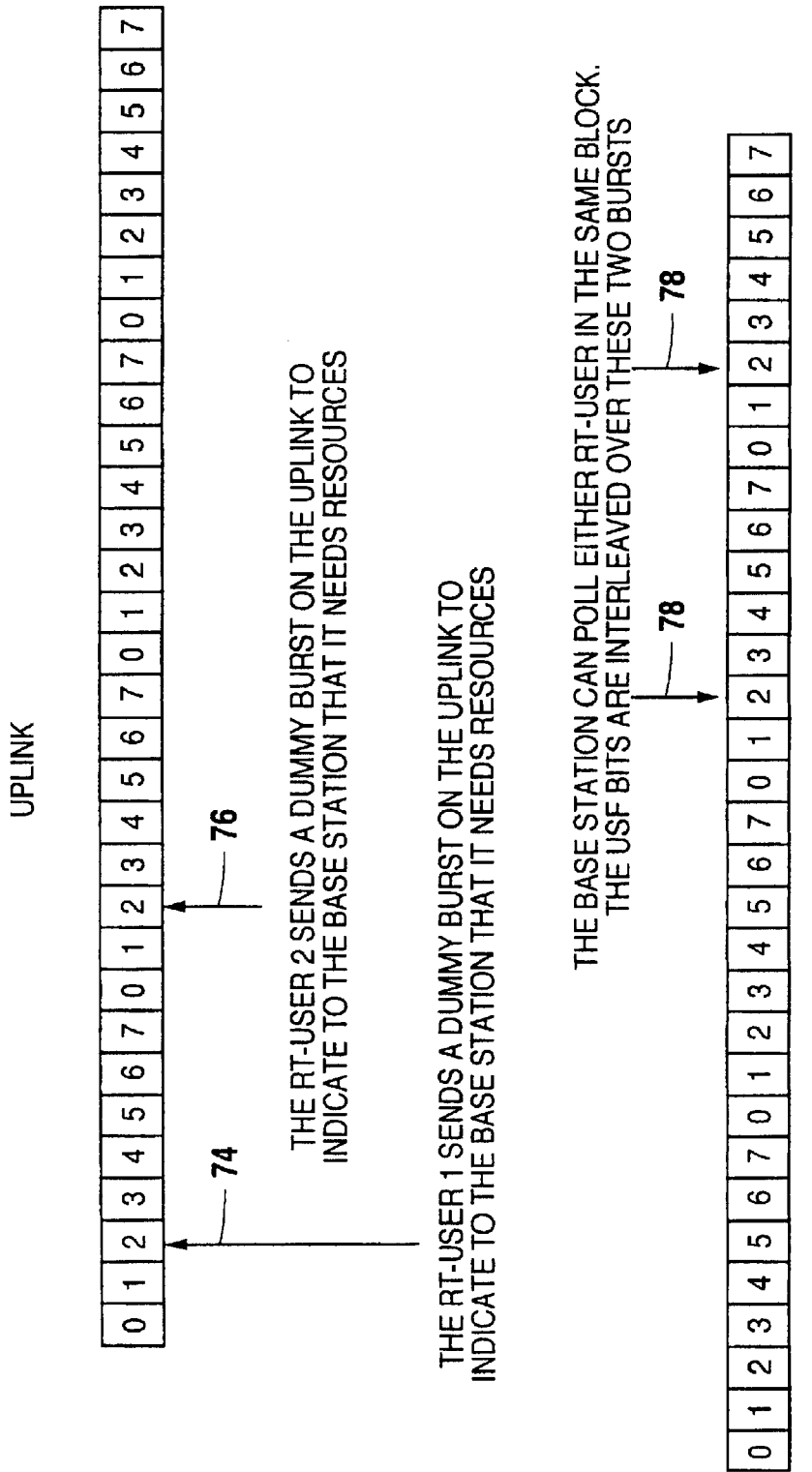
FIG. 5 is a schematic diagram of a process for obtaining fast access to an uplink channel in a packet data network having two real time users multiplexed on the same timeslot in accordance with yet another embodiment of the invention.

In accordance with yet another embodiment of the invention, two real time users 10(1) can be multiplexed on the same timeslot while still providing for fast access to the uplink channel. Referring now to FIG. 5, there is illustrated a schematic diagram of a process for obtaining fast access to an uplink channel in a packet data network 6 having two real time users multiplexed on the same timeslot. This embodiment is similar to the embodiment of FIG. 4 except that one of the real time users 10(1) is assigned (via signaling from the base station 26) to create a collision (as indicated at 74) on the first burst of an uplink block 56 when that user 10(1) needs to request uplink resources, while another real time user 10(1) is assigned to create a collision (as indicated at 76) on the second burst of an uplink block 56 when the second user 10(2) needs to request uplink resources. By then confining the interleaving of the USF to the last two bursts 46 of the downlink blocks 42, the base station 26 can poll either real time user 10(1) in the same block as it detects the collision.

For example, if the base station 26 detects a collision in the first burst of a first uplink block 56(1), the base station 26 can authorize the first real time user 10(1) to transmit on a second uplink block 56(2) by designating the USF value for the first real time user 10(1) in the last two bursts of the first downlink block 56(1) (as indicated at 78). On the other hand, if the base station 26 detects a collision in the second burst of a first uplink block 56(1), the base station 26 can authorize the second real time user 10(1) to transmit on a second uplink block 56(2) by designating the USF value for the second real time user 10(1) in the last two bursts of the first downlink block 56(1) (as indicated at 78). If the base station 26 detects a collision in both the first and second bursts of a first uplink block 56(1), the base station 26 can select, randomly or according to a priority determination, which real time user 10(1) to schedule on a second uplink block 56(2). In addition, the base station 26 could then alternate scheduling of subsequent uplink blocks 56 between the two real time users 10(1) until one or both of the real time users 10(1) stops responding to the polling.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method of providing a first mobile station with fast access to a multiplexed uplink channel in a mobile telecommunications system, comprising the steps of:
   assigning an uplink channel to the first mobile station;
   assigning a first uplink block of the uplink channel to a second mobile station during a period of silence by the first mobile station;
   receiving simultaneous transmissions from the first and second mobile stations on the first uplink block of the uplink channel; and
   assigning a next sequential uplink block of the uplink channel to the first mobile station in response to the reception of the simultaneous transmissions on the first uplink block.

2. The method of claim 1, wherein the first uplink block comprises a plurality of bursts.

3. The method of claim 2, wherein the transmission from the first mobile station is transmitted in at least one of the plurality of bursts.

4. The method of claim 3, wherein the step of assigning the next sequential uplink block of the uplink channel to the first mobile station comprises transmitting an indication of the next sequential uplink block assignment in at least one of a plurality of bursts of a downlink block, at least a portion of said downlink block being transmitted concurrently with at least a portion of the first uplink block.

5. The method of claim 4, wherein the reception of the transmission from the first mobile station occurs before the transmission of the assignment indication, the transmission of the assignment indication being performed in response to the reception of the transmission from the first mobile station.

6. The method of claim 4, wherein the assignment indication comprises an uplink state flag.

7. The method of claim 1, wherein the first uplink block and the next sequential uplink block comprise resources in a packet data transmission system.

8. The method of claim 1, wherein the step of assigning the first uplink block to the second mobile station comprises transmitting an indication of the first uplink block assignment in a first downlink block, at least a portion of said first downlink block being transmitted prior to the first uplink block, and the step of assigning the next sequential uplink block to the first mobile station comprises transmitting an indication of the next sequential uplink block assignment in a second downlink block.

9. The method of claim 1, wherein the second mobile station transmits data on the first uplink block of the uplink channel.

10. The method of claim 9, wherein the transmission from the first mobile station is transmitted at a higher power level than the transmission from the second mobile station.

11. The method of claim 9, wherein the transmission from the first mobile station collides with the transmission from the second mobile station, the step of assigning the next sequential uplink block to the first mobile station further performed in response to a detection of the collision.

12. The method of claim 11, further comprising the step of receiving data from the first mobile station in a second uplink block, said second uplink block being selectively assigned, prior to the assignment of the next sequential uplink block to the first mobile station, to either the second mobile station or a third mobile station.

13. A mobile telecommunications system, comprising:
   a packet data network including a packet data support node for routing data communications to and receiving data communications from a plurality of mobile stations located in an area served by the packet data support node; and
   a radio network for transmitting data packets between said plurality of mobile stations and the packet data support node, wherein said radio network operates to:
      assign an uplink channel to a first mobile station performing real-time data communications;
      assign a first radio resource associated with the uplink channel to a second mobile station during a period of silence by the first mobile station;
      detect simultaneous transmissions from the first and second mobile stations on the first radio resource associated with the uplink channel; and
      assign a second radio resource associated with the uplink channel to the first mobile station in response to the detected simultaneous transmissions.

14. The system of claim 13, wherein the radio network comprises a base station, wherein said base station is operable to perform the assignment of the first radio resource to the second mobile station, the detection of the transmission from the first mobile station, and the assignment of the second radio resource to the first mobile station.

15. The system of claim 13, wherein the radio network comprises a base station controller, wherein said base station controller is operable to perform the assignment of the first radio resource to the second mobile station, the detection of the transmission from the first mobile station, and the assignment of the second radio resource to the first mobile station.

16. The system of claim 13, wherein the radio network operates to:
   assign the first radio resource to the second mobile station by transmitting an indication of the first radio resource assignment on a downlink channel associated with the uplink channel; and
   assign the second radio resource to the first mobile station by transmitting an indication of the second radio resource assignment on the downlink channel.

17. The system of claim 16, wherein the indication of the first resource assignment and the indication of the second resource assignment comprise uplink state flags contained in a downlink block.

18. The system of claim 16, wherein the first radio resource comprises a first uplink block of the uplink channel and the second radio resource comprises a second uplink block of the uplink channel.

19. The system of claim 19, wherein the transmission from the first mobile station is detected in a first portion of the first uplink block and the indication of the second resource assignment is transmitted in a downlink block of the downlink channel, at least a portion of said downlink block transmitted concurrently with at least a second portion of said first uplink block.

20. The system of claim 13, wherein the radio network further operates to receive data from the first mobile station on an intermediate radio resource assigned between the assignment of the first radio resource and the assignment of the second radio resource, said intermediate radio resource being selectively assigned by the radio network to either the second mobile station or a third mobile station.

21. A method of providing a real-time (RT) user with fast access to a multiplexed uplink channel in a mobile telecommunications system, comprising the steps of:
   assigning an uplink channel to the RT user;
   assigning a first radio resource of the uplink channel to a non-real-time (non-RT) user during a period of silence by the RT user;
   detecting a collision between a plurality of transmissions on the first radio resource of the uplink channel; and
   assigning a second radio resource of the uplink channel to the RT user in response to the detected collision.

22. A method of providing a real-time mobile station with fast access to a multiplexed uplink channel in a mobile telecommunications system, comprising the steps of:
   assigning a plurality of mobile stations to a specific uplink channel, at least one of the mobile stations being a real-time mobile station that transmits whenever needed in accordance with a real-time application, and the remaining mobile stations transmitting only when assigned to a specific uplink block of the uplink channel;
   detecting simultaneous transmissions from at least two of the plurality of mobile stations on a first uplink block of the uplink channel; and
   assigning, in response to the detection of the simultaneous transmissions, a next sequential uplink block of the uplink channel to the real-time mobile station.

23. The method of claim 22, wherein the first uplink block comprises a plurality of bursts.

24. The method of claim 23, wherein the step of assigning the second uplink block to the real-time mobile station comprises transmitting an indication of the second uplink block assignment on a downlink block of a downlink channel, said downlink channel being associated with the uplink channel.

25. The method of claim 24, wherein the downlink block of the downlink channel comprises a plurality of bursts.

26. The method of claim 25, wherein the simultaneous transmissions are detected on a subset of the plurality of first uplink block bursts and the indication of the second uplink block assignment is transmitted on a subset of the plurality of downlink block bursts, at least a portion of the first uplink block received concurrently with the transmission of at least a portion of the downlink block.

27. The method of claim 23, wherein the plurality of mobile stations comprise a first real-time mobile station and a second real-time mobile station, the step of assigning the second uplink block further comprising assigning the second uplink block to the first real-time mobile station if the simultaneous transmissions occurred on a first subset of the plurality of first uplink block bursts, and assigning the second uplink block to the second real-time mobile station if the simultaneous transmissions occurred on a second subset of the plurality of first uplink block bursts.

* * * * *